United States Patent [19]

Dinardo, Jr.

[11] 4,282,311

[45] Aug. 4, 1981

[54] METHOD FOR FABRICATING FLYLEADS FOR VIDEO DISC STYLI

[75] Inventor: Joseph R. Dinardo, Jr., Levittown, Pa.

[73] Assignee: RCA Corporation, New York, N.Y.

[21] Appl. No.: 81,486

[22] Filed: Oct. 3, 1979

[51] Int. Cl.³ .................... G03C 11/00; G03C 5/00
[52] U.S. Cl. .................... 430/318; 156/634; 156/661.1; 430/319; 430/323; 430/320; 430/328; 430/329; 430/502; 430/394
[58] Field of Search ............... 430/313, 318, 319, 323, 430/502, 320, 394, 328, 329; 156/631, 634, 659, 661

[56] References Cited

U.S. PATENT DOCUMENTS

| | | | |
|---|---|---|---|
| 3,469,982 | 9/1969 | Celeste | 430/256 |
| 3,539,259 | 11/1970 | Hillman et al. | 430/319 X |
| 3,767,398 | 10/1973 | Morgan | 430/318 X |
| 3,842,194 | 10/1974 | Clemens | 178/6.6 A |
| 3,952,147 | 4/1976 | Leedom | 178/6.6 R |
| 3,960,561 | 6/1976 | Haining et al. | 430/318 X |
| 4,077,050 | 2/1978 | Dholakia | 358/128 |
| 4,162,510 | 7/1979 | Keizer | 358/128 |

FOREIGN PATENT DOCUMENTS 1275471  5/1972  United Kingdom .

OTHER PUBLICATIONS

DeForest, *Photoresist, Materials and Processes*, 1975, pp. 163-212.

*Primary Examiner*—Edward C. Kimlin
*Attorney, Agent, or Firm*—Birgit E. Morris; Allen Bloom

[57] ABSTRACT

A method of making flyleads for video disc playback cartridges wherein a dry film resist is coated on both sides of a metal sheet, one side is exposed through a patterned mask, the patterned side is developed and etched, and the remaining photoresist is removed.

7 Claims, 9 Drawing Figures

METHOD FOR FABRICATING FLYLEADS FOR VIDEO DISC STYLI

This invention relates to a method for preparing flyleads. More particularly this invention relates to a method for preparing flyleads for video disc styli by photolithography.

BACKGROUND OF THE INVENTION

U.S. Pat. No. 3,842,194 of Jon K. Clemens disclosed a video disc having a playback system utilizing variable capacitance. In one configuration of the Clemens system information representative of recorded picture and sound is encoded in the form of a relief pattern in a relatively fine spiral groove on the surface of a disc record. For example, groove widths about 3.5 micrometers and groove depths of about 1.0 micrometer may be used. During playback a pickup stylus about 2.0 micrometers wide having a thin conductive electrode thereon, for example, about 0.2 micrometer thick, engages the groove as the record is rotated by a supportive turntable. Capacitive variations between the stylus electrode and the record surface are sensed to recover the pre-recorded information.

In the system of the above type the use of a relatively fine record groove and the groove engaging requirements for the pickup stylus results in a stylus tip which is extremely small. In U.S. Pat. No. 4,162,510 of Keizer, entitled "Keel-Tipped Stylus for Video Disc Systems", a novel keel-tipped pickup stylus structure is disclosed.

The pickup stylus is part of the signal pickup assembly of a video disc record player. The assembly is housed in a protective housing such as the pickup cartridge described in Leedom, U.S. Pat. No. 3,952,147, which also facilitates replacement of the signal pickup assembly without any critical manual adjustments or connections.

Dholakia, in U.S. Pat. No. 4,077,050 incorporated herein by reference, describes a leaf spring (flylead) for urging the stylus into the record groove. One end of the leaf spring is secured to the stylus and the second end is mounted within the cartridge above the stylus. The leaf spring provides stylus tracking pressure, properly locates the free end of the stylus arm relative to the carriage and establishes electrical connection between the electrode on the stylus and the signal processing circuitry of the player.

The flyleads are thin, about 0.0002 to about 0.0008 inch (5.08–20.32 micrometers) thick, about 0.04 to 0.01 inch (0.09–0.03 cm) wide and about 1 inch (2.5 cm) long. The flyleads are generally fabricated out of an electrically conductive metal.

Small items can be fabricated by ordinary photolithographic processes which employ a photoresist and include development and etching steps. A pattern is recorded in the photoresist by exposure to light through an appropriate mask. The unwanted photoresist is removed by selectively dissolving the photoresist in a solvent. The resulting pattern is then transferred to the underlying substrate material by an etching technique. The photoresist must be resistant to attack by the etchant.

The two principal types of photoresists are positive working and negative working. If a positive working photoresist is used, the exposed areas become more soluble in a solvent, called the developer solvent, than the unexposed areas. Thus, in the development step the developer removes photoresist from the exposed region leaving the bare substrate. If a negative photoresist is used, the exposed regions become less soluble in the developer. Therefore, in the development step the developer removes the photoresist from the unexposed areas, baring the substrate.

The uncovered substrate is then etched with an etchant which preferentially attacks the substrate rather than the photoresist, thereby transferring the pattern to the substrate. Finally, the remaining photoresist is removed by an appropriate solvent.

Thin beryllium copper alloy sheets can be used to fabricate the flyleads. The sheets are fragile and cannot be easily handled because they easily bend and kink. Furthermore, standard photolithographic methods were found not to be effective. For example, severe undercutting occurs at moderate bath temperatures (130° F. (54° C.)). Undercutting is an attack by an etching or developing solution upon the substrate walls underneath the photoresist layer, or the photoresist walls beneath the insoluble surface photoresist layer, respectively. Undercutting results in a surface pattern having sloped walls rather than the desired straight walls.

It would, therefore, be desirable to have a process for preparing flyleads which overcomes these handling and processing difficulties.

SUMMARY OF THE INVENTION

A method for preparing a flylead for a video disc playback cartridge comprising the steps of laminating a dry film photoresist to both sides of a thin metal sheet, exposing one side to light through a patterned mask, developing the patterned side with a solvent developer to selectively remove photoresist, etching the resulting exposed metal sheet portions and removing the remaining photoresist from both sides of the etched metal sheet.

DETAILED DESCRIPTION OF THE INVENTION

Figure 1:
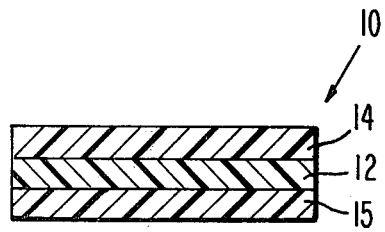
FIG. 1 is a schematic drawing of a dry film photoresist which may be employed in this invention.

A dry film photoresist 10 which can be used in this invention is schematically shown in FIG. 1. The dry film photoresist 10 comprises a photoresist layer 12 sandwiched between a polyester layer 14 and a layer of a polyolefin 15. The polyester can be a polyethylene terephthalate. The polyolefin layer 15 can be polyethylene. A suitable dry film resist 10 is Riston 210R (E. I. DuPont de Nemours & Co.), an aqueous-processable acrylic photopolymer photoresist layer 12 sandwiched between a polyester and a polyolefin layer 14 and 15, respectively. Suitable compositions and layers for dry film photoresist 10 are discussed in Celeste, U.S. Pat. No. 3,469,982 and U.K. Pat. No. 1,275,471. Additional information can be found in DeForest, *Photoresist*, Chapter 6, McGraw-Hill Book Company, New York, 1975.

The flyleads are fabricated out of a thin conductive metal. Alloys of copper and beryllium have been found to be particularly useful.

Figure 2:
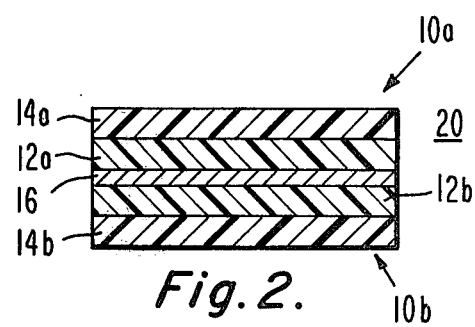
FIG. 2 is a schematic drawing of a metal sheet laminated on both sides with a dry film photoresist.

A thin metal sheet 16, about 0.0002–0.0008 inch (5.2–20.3 micrometers) thick is coated on both sides with a dry film resist, 10a and 10b respectively, forming coated sheet 20 shown in FIG. 2. The polyolefin layer 15 is removed prior to contacting the photoresist layer 12 with the metal sheet 16. A laminator having a continuous feed capability can be used to coat both sides of the metal sheet 16.

Generally the surfaces of metal articles are degreased prior to coating with a photoresist. However, the thin metal sheets when cut into working pieces prior to photoresist coating, curled and wrinkled during the degreasing operation. As a result, it was found that the metal sheets could be coated with the photoresist without a degreasing step without any failures due to poor adhesion of the resist to the metal surface.

The coated sheet 20 can then be cut into working size pieces, for example, about 4 inches (10.2 cm) wide and about 8–8.5 inches (20.3–21.6 cm) long. All excess resist is trimmed to the edges of the metal sheet 16. As shown in FIG. 2, the coated sheet 20 comprises the metal sheet 16 coated on both sides with the photoresist layers 12a and 12b, respectively, which are in turn covered with protective polyester sheets 14a and 14b respectively. The coated sheet 20 increases the "working thickness" by approximately 0.004 inch (101.6 micrometers) with each of the resist layers 12a and 12b and the protective sheets 14a and 14b being approximately 0.001 inch (25.4 micrometers) thick. The combined increased thickness of these layers adds structural stability to the coated sheet 20 which allows for relatively routine handling until the final stripping stage.

Figure 3:
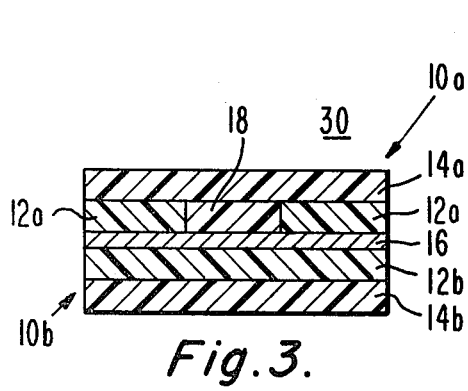
FIG. 3 is a schematic drawing of a laminated metal sheet following exposure through a mask.

The coated sheet 20 is allowed to set up for about 15–30 minutes at room temperature. A first side 10a is then exposed through a mask to actinic radiation to which the photoresist layer 12a is sensitive in order to transfer the flylead pattern to the photoresist layer 12a. A suitable method of transferring the pattern is by contact printing. The coated exposed metal sheet 30 is shown in FIG. 3. For a negative working photoresist the exposed area 18 of the photoresist 12a is crosslinked. The exposed area 18 corresponds to the part of the mask through which the effective actinic radiation has passed. Although only one exposed area 18 is shown in FIG. 3, it is to be understood that a plurality of such exposed areas may be present.

Figure 4:
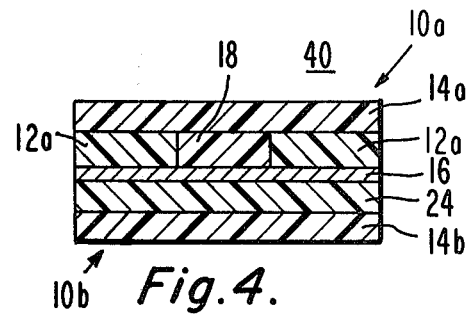
FIG. 4 is a schematic drawing of a laminated metal sheet after its second side has been flood exposed to light.

Following exposure, the coated exposed sheet 30 is allowed to set up for at least about 15 minutes. Optionally, the other photoresist layer 12b can be flood exposed without any mask. The resulting doubly exposed coated sheet 40 is shown in FIG. 4 where the exposed photoresist layer 24 is completely crosslinked. Such a flood exposure, although not required, stiffens the structure which results in easier handling.

Figure 5:
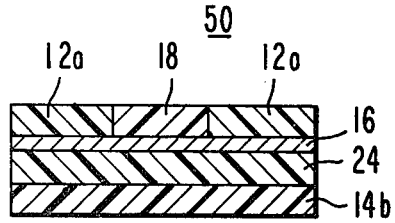
FIG. 5 is a schematic drawing of a laminated metal sheet after the protective sheet of the side which had been exposed through a mask is removed.

The top polyester layer 14a of the doubly exposed coated sheet 40 is then removed to prepare the structure 50 shown in FIG. 5. The bottom polyester layer 14b is allowed to remain in place to protect against pinhole formation in the exposed photoresist layer 24 or the unexposed bottom photoresist layer 12b as well as to serve as an adherent backing which gives the metal sheet 16 some additional stability and protection through the remaining steps of the process.

Figure 6:
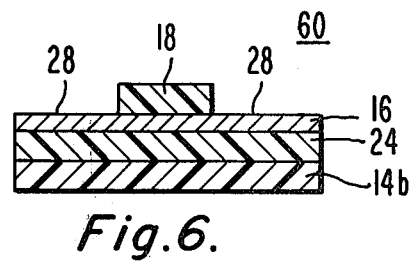
FIG. 6 is a schematic drawing of a laminated metal sheet after development.

The structure 50 is then developed to remove the unexposed resist layer 12a. For example, the developer solvent can comprise a weakly basic aqueous solution such as DuPont Riston II Developer 2000. After development, the sample is rinsed with water and allowed to dry. The resulting developed structure 60 is shown in FIG. 6 with the exposed photoresist layer 18 and the bared metal surface 28 of the metal sheet 16 where the unexposed photoresist was removed.

The bared metal surface 28 can be etched using, for example, an aqueous ferric chloride solution as etchant. A continuous feed etching apparatus such as the Chemcut Model 315 can be used for a metal sheet 16 at least about 0.0005 inch (12.7 micrometers) thick. In general, the operating temperature of the etchant bath is about 130° F. (54.4° C.). However, it has been found that because of the thinness of the metal sheet 16 this elevated temperature could not be used. When a heated bath is used extreme undercutting is observed even at the fastest conveyor speed tried, about 2.5 feet (0.76 meter) per minute. At this speed the metal sheet 16 is in contact with the etchant for about 1 minute. For an 0.0005 inch (12.7 micrometers) thick beryllium copper alloy metal sheet 16, a room temperature bath operating at a conveyor speed of about 2.5 feet (0.76 meter) per minute results in straight wall etching with no observed undercutting. For thicknesses greater than about 0.0005 inch (12.7 micrometers) the conveyor speed can be slowed. For thicknesses less than 0.0005 inch (12.7 micrometers) a tray method is preferred in which the developed structure 60 is placed in a tray containing a 60° C. aqueous ferric chloride solution until the metal sheet 16 has been etched. Control is maintained by visual inspection.

The density of the aqueous ferric chloride solution must be controlled. For a continuous feed etching apparatus the density of the ferric chloride solution should be about 32°–42° Baume, preferably about 36°–40° Baume. At lower densities the rate at which the metal sheet 16 is etched is too low. At higher densities, the etch rate is too rapid and the edges of the etched metal are ragged. For the tray etching method, a density of about 38°–42° Baume is preferred.

Figure 8:
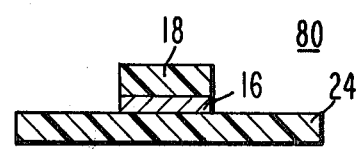
FIG. 8 is a schematic drawing after the second protective sheet has been removed from the laminated metal sheet.
Figure 7:
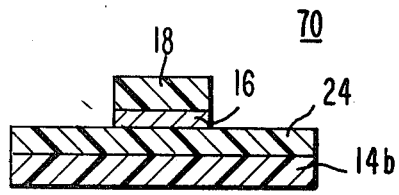
FIG. 7 is a schematic drawing of a laminated metal sheet after etching.
Figure 9:
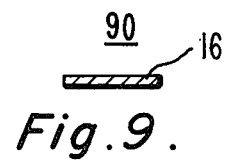
FIG. 9 is a schematic drawing of the finished flylead.

The etched structure 70 is shown in FIG. 7. The portions of the metal sheet 16 having bared metal surfaces 28 not covered by the exposed photoresist layer 18 are removed by the etchant until the previously flood-exposed photoresist layer 24 or the unexposed photoresist layer 12b are reached. After etching the bottom protective polyester layer 14b is removed, and the resulting structure 80 is shown in FIG. 8. The remaining photoresist layers 24 (or 12b) and 26 can be removed with a stripper solvent such as methylene chloride or acetone. The structure 80 is placed in a stripping bath and allowed to remain until the photoresist has dissolved or peeled off. The final metal flylead 90 is treated in a series of stripper baths until all of the photoresist is removed. Care must be taken to continually remove all solids from the stripper baths in order to prevent redeposition of unwanted debris onto the metal sheet 16. The final metal flylead 90 is shown in FIG. 9.

This invention will be further illustrated by means of the following Example, but it is to be understood that the invention is not meant to be limited by the details described therein.

EXAMPLE

A 0.0005 inch (12.57 micrometers) thick sheet of Berylco 25 beryllium copper alloy was coated on both sides with DuPont Riston 210R dry film photoresist using a DuPont Model A24 laminator. Berylco 25, available from Kawecki; Berylco Industries, Inc., compromises 1.8 to 2 percent beryllium, a minimum of 0.2 percent cobalt plus nickel, a maximum of 0.6 percent cobalt plus nickel plus iron and a minimum of 99.5 percent of copper plus the named elements.

The coated sheet was allowed to set up for 30 minutes at room temperature. The sheet was cut into working pieces of dimensions 4×8.5 inches (10.2×21.5 cm) and trimmed to the edge of the metal sheet.

A first side of a photoresist coated alloy piece was contact printed for 1 minute in a NuArc platemaker Flip Top Model FT26L modified to use a xenon pulse lamp through a mask having a pattern of five adjoining flyleads of the type described in Dholakia, U.S. Pat. No. 4,077,050. The exposed piece was allowed to set up for 30 minutes. The second photoresist side was then flood exposed in the absence of a mask in the NuArc platemaker for 1 minute and allowed to set up for 30 minutes. Following exposure, the polyester cover sheet was removed from the first side. The photoresist on the first side was solvent developed for 90 seconds with Riston II Developer 2000 utilizing a DuPont Model A24 processor, rinsed in water for 30 seconds and dried.

The portion of the metal sheet exposed by the development step was etched at room temperature employing a 38° Baume aqueous ferric chloride solution and a Chemcut Model 315 etcher operating at a conveyor speed of 2.5 feet (0.76 meter) per minute. The etched metal sheet was then washed with water and allowed to dry at room temperature.

The remaining photoresist was then stripped by immersing the sheet sequentially in three trays containing acetone. The resulting shaped sheet, which was visually free of photoresist, was allowed to dry in an oil-free environment. The flylead edges were well defined, the walls were straight and perpendicular to the faces and the thickness of the flyleads was uniform.

I claim:

1. A method for preparing a flylead for video disc pickup cartridges consisting essentially of the steps of
    laminating a dry film photoresist to both sides of a thin metal sheet between about 0.0002 and 0.0008 inches thick,
    exposing the first side to light through a mask so that the pattern on the mask is transferred to the photoresist,
    developing the patterned side with a solvent developer to selectively remove photoresist thereby exposing the underlying metal sheet,
    etching the exposed metal sheet, and
    removing the remaining photoresist from both sides of the etched metal sheet.

2. The method of claim 1 wherein the etchant is an aqueous ferric chloride solution.

3. The method of claim 2 wherein the density of the ferric chloride solution is about 32°–42° Baume.

4. The method of claim 1 wherein the photoresist is a negative working photoresist.

5. The method of claim 1 wherein the photoresist is a positive working photoresist.

6. The method of claim 1 wherein the metal sheet comprises a beryllium copper alloy.

7. The method of claim 4 which includes the additional step of flood exposing the second side to light.

* * * * *